US010051520B2

(12) United States Patent
Duan

(10) Patent No.: US 10,051,520 B2
(45) Date of Patent: Aug. 14, 2018

(54) METHOD AND DEVICE FOR NETWORK CAPACITY CONTROL

(71) Applicant: DATANG MOBILE COMMUNICATIONS EQUIPMENT CO., LTD, Beijing (CN)

(72) Inventor: Jianghai Duan, Beijing (CN)

(73) Assignee: Datang Mobile Communications Equipment Co., Ltd, Beijing (CN)

( * ) Notice: Subject to any disclaimer, the term of this patent is extended or adjusted under 35 U.S.C. 154(b) by 0 days.

(21) Appl. No.: 14/912,401

(22) PCT Filed: Jul. 28, 2014

(86) PCT No.: PCT/CN2014/083163
§ 371 (c)(1),
(2) Date: Feb. 16, 2016

(87) PCT Pub. No.: WO2015/021856
PCT Pub. Date: Feb. 19, 2015

(65) Prior Publication Data
US 2016/0192240 A1    Jun. 30, 2016

(30) Foreign Application Priority Data

Aug. 16, 2013 (CN) .......................... 2013 1 0358923

(51) Int. Cl.
*H04W 28/16* (2009.01)
*H04W 48/18* (2009.01)
(Continued)

(52) U.S. Cl.
CPC ........... *H04W 28/16* (2013.01); *H04W 48/18* (2013.01); *H04W 76/11* (2018.02); *H04W 76/12* (2018.02); *H04M 15/66* (2013.01); *H04W 4/24* (2013.01)

(58) Field of Classification Search
CPC ... H04W 28/16; H04W 48/18; H04W 76/021; H04W 76/022; H04W 4/02; H04W 4/24; H04W 76/10–76/19; H04M 15/66
See application file for complete search history.

(56) References Cited

U.S. PATENT DOCUMENTS 8,356,107 B2 *   1/2013   Xia ......................... H04L 12/14
                                                                709/229
8,392,571 B2 *   3/2013   Schlansker ........... H04L 47/522
                                                                709/226
(Continued)

FOREIGN PATENT DOCUMENTS

CN         102342052 A      2/2012
CN         102356581 A      2/2012
(Continued)

OTHER PUBLICATIONS

PCT Notification Concerning Transmittal of International Preliminary Report on Patentability (Chapter I of the Patent Cooperation Treaty) for counterpart PCT Application No. PCT/CN2014/083163, 10 pp. (including English translation), (dated Feb. 25, 2016).
(Continued)

*Primary Examiner* — Khaled Kassim
*Assistant Examiner* — Thomas R Cairns
(74) *Attorney, Agent, or Firm* — Womble Bond Dickinson (US) LLP

(57) ABSTRACT

The present invention relates to a method for network capacity control for use in controlling use by a MVNO of MNO network capacity. The method of the present invention comprises: an MNO-PCRF receives an IP-CAN session establishment instruction message and, on the basis of the user identifier therein, determines the mobile virtual network operator (MVNO) to which a UE belongs and forwards the IP-CAN session establishment instruction message to the MVNO-PCRF unit; an IP-CAN session establishment con-
(Continued)

firmation message is received from the MVNO-PCRF carrying the policy and charging control (PCC) rules of the UE, and the PCC rules of the UE are then used; when it is confirmed that the MVNO to which the UE belongs has not exceeded the authorized capacity of said MVNO, an IP-CAN session establishment confirmation.

14 Claims, 8 Drawing Sheets

(51) Int. Cl.
*H04W 76/12* (2018.01)
*H04W 76/11* (2018.01)
*H04M 15/00* (2006.01)
*H04W 4/24* (2018.01)

(56) References Cited

U.S. PATENT DOCUMENTS

| | | | |
|---|---|---|---|
| 8,645,510 B2* | 2/2014 | Siddam | H04L 12/1407 709/221 |
| 8,971,846 B2* | 3/2015 | Kumar | H04L 12/14 455/410 |
| 9,055,003 B2* | 6/2015 | Baratakke | H04L 49/70 |
| 9,158,635 B2* | 10/2015 | Fernandez Alonso | H04L 12/1407 |
| 9,357,372 B1* | 5/2016 | Ridel | H04M 15/64 |
| 2009/0154413 A1 | 6/2009 | Kim et al. | |
| 2009/0181641 A1* | 7/2009 | Fiatal | H04M 3/4872 455/406 |
| 2011/0317718 A1 | 12/2011 | Siddam et al. | |
| 2012/0246325 A1 | 9/2012 | Pancorbo Marcos et al. | |
| 2014/0235236 A1* | 8/2014 | Gallmann | H04W 8/02 455/432.1 |
| 2015/0105045 A1* | 4/2015 | Rolfe | H04M 15/765 455/406 |

FOREIGN PATENT DOCUMENTS

| | | |
|---|---|---|
| CN | 103221941 A | 7/2013 |
| CN | 103442394 A | 12/2013 |

OTHER PUBLICATIONS

Office Action for corresponding Japanese Patent Application No. 2016-516089, 4 pp., (dated Oct. 4, 2016).

3GPP, "3rd Generation Partnership Project: Technical Specification Group Services and System Aspects; Policy and charging architecture (Release 12)", 3GPP TS 23.203 V12.1.0, retrieved from the Internet: http://www.3gpp.org/ftp/Specs/archive/23_series/23.203/23203-c10.zip, pp. 1-189, (Jun. 2013).

Rebecca Copeland, et al., "Resolving Ten MVNO issues with EPS Architecture, vol. TE and Advanced Policy Server", IEEE, 15th International Conference on Intelligence in Next Generation Networks, pp. 29-34, (2011).

PCT International Search Report for counterpart PCT Application No. PCT/CN2014/083163, 5 pp. (including English translation), (dated Nov. 19, 2014).

PCT Written Opinion of the International Searching Authority for counterpart PCT Application No. PCT/CN2014/083163, 6 pp. (including English translation), (dated Nov. 15, 2014).

Chinese Patent Office, Search Report for corresponding Chinese Patent Application No. 201310358923.X, dated Aug. 16, 2016, 5 pages.

European Patent Office, Extended European Search Report for corresponding EP Application No. 14836752.7, dated Jul. 4, 2016, 10 pages.

European Patent Office, Communication pursuant to Article 94(3) EPC for corresponding EP Application No. 14836752.7, dated May 4, 2017, 10 pages.

Ouelette et al, "A Potential Evolution of the Policy and Charging Control/QoS Architecture for the 3GPP IETF-based Evolved Packet Core," IEEE Communications Magazine, IEEE Service Center, Piscataway, US, vol. 49, No. 5, May 1, 2011, pp. 231-239.

Yeali S. Sun, et al., "Optimal Incentive-Compatible Pricing for Dynamic Bandwidth Trading and Allocation in Efficient Spectrum Management," Global Telecommunications Conference (GLOBECOM 2011), 6 pgs. (Dec. 5-9, 2011).

* cited by examiner

METHOD AND DEVICE FOR NETWORK CAPACITY CONTROL

CROSS-REFERENCE TO RELATED APPLICATIONS

This patent application is a U.S. National Phase Application under 35 U.S.C. § 371 of International Application No. PCT/CN2014/083163, filed on Jul. 28, 2014, entitled METHOD AND DEVICE FOR NETWORK CAPACITY CONTROL, which claims the benefit of Chinese Patent Application No. 201310358923.X, filed with the State Intellectual Property Office of People's Republic of China on Aug. 16, 2013, and entitled "Method and device for controlling network capacity", the content of which was incorporated by reference in its entirety.

FIELD

The present invention relates to the field of communications and particularly to a method and device for controlling network capacity.

BACKGROUND

A Mobile Virtual Network Operator (MVNO) generally refers to an operator providing its users with a mobile service through a network of another Mobile Network Operator (MNO). The MVNO relates to a network operating mode proposed based upon network sharing, and the MVNO is introduced so that a number of operators can invest together in deploying a shared network, or lease a network of another operator for a lower risk of investment, rapid deployment and operating of the network, and other advantages.

A mobile communication resale service is a general form in which the MVNO is applied in the industry. It refers to a mobile communication service in which a mobile communication service is purchased from an underlying telecommunication service provider possessing a mobile network (i.e., the MNO), and packed into its own band and sold to end users. A mobile communication resale enterprise (i.e., the MVNO) typically does not deploy its own radio network, core network, transmission network, and other mobile communication network infrastructures, but has to deploy a client service system, and also possesses its own business support system and service platform. Since the respective MVNOs develop their respective groups of users, there may be a potential user competitive relationship between the MVNOs and between the MVNOs and the MNO, so in order to guarantee the security of the MVNOs in operation, that is, user information of the MVNOs must not be exposed to the outside, the MVNOs typically deploy their own Home Subscriber Server (HSS) device. Moreover, since the MVNOs need to define their own policy and charging rules, the MVNOs generally also possess Policy and Charging Rule Function (PCRF) devices separately.

As illustrated in FIG. 1, network resources provided by the MNO include an Evolved Universal Terrestrial Radio Access Network (E-UTRAN), a Mobility Management Entity (MME), a Serving Gateway (S-GW), a Packet Data Network (PDN) Gateway (P-GW), a Charging Gateway (CG), and other devices. The network resources of the MNO are shared by a number of $MVNO_I$ ($1<=I<=N$). Each of the MVNOs possesses its own Business and Operation Support System (BOSS), Application Function (AF), HSS, PCRF, and other devices, and provides a service using the network resources granted by the MNO. The MVNOs develop their groups of users separately, where the group of users for the $MVNO_1$ is $UE_{1k}$ ($1<=k<=K$), the group of users for the $MVNO_2$ is $UE_{2l}$ ($1<=l<=L$), etc.

The MVNOs need to lease the network resources of the MNO by purchasing network capacities and software functions from the MNO according to the scales of their own developed groups of users, types of services to be deployed by themselves, their own capital investment budgets, and other real conditions. The different MVNOs typically purchase different network capacities, and their desirable optional software functions may also be different from each other. As the provider of the network resources, on one hand, the MNO needs to grant the network capacities of the MVNOs by limiting accesses of MVNOs to the network resources, e.g., the numbers of user equipments allowed for an access, the number of Evolved Packet System (EPS) bearers allowed to be set up, etc.; and on the other hand, the MNO further needs to control software licenses to the MVNOs according to the software functions purchased by the MVNOs. The network capacities accessible to the MVNOs and the software functions licensed to the MVNOs are controlled by the MME. For example, the network resources of the MNO are shared by three MVNOs. For the MVNO1, the MME allows 100 millions of user equipments for an access, and 150 millions of EPS bearers to be set up, and enables the two optional software functions of Network Assisted Cell Change (NACC) and Circuit Switched Fallback (CSFB) in addition to general software functions; for the MVNO2, the MME allows 100 thousand of user equipments for an access, and 200 thousand of EPS bearers to be set up, and disables any optional software functions except the general software functions; and for the MVNO3, the MME allows 500 thousand of user equipments for an access, and 800 thousand of EPS bearers to be set up, and enables only the optional software function of Idle mode Signaling Reduction (ISR) in addition the general software functions.

In summary, in the prior art, the network capacities of the MVNOs are controlled without controlling data traffic allowed for the MVNOs generally for the following reasons:

(1) The MME device is a control plane device incapable of controlling the data traffic;

(2) The business plane of the P-GW/S-GW device is typically enabled using a pool of resources so that UE data of the MVNOs are not centrally processed, and it may be difficult to control the traffic of some MVNO; and (3) The user information of the MVNOs are transparent to the MNO, and the MNO does not know user subscription information (e.g., subscriber levels) in some MVNO, so even if the traffic of the MVNO can be controlled, then only a subscriber can be selected randomly from the MVNO and treated without differentiating the subscriber from the other subscribers.

There is some specific handling capacity of the MNO, so if the data traffic of the MVNOs is not controlled, then if the traffic used by one of the MVNOs exceeds the traffic purchased by the MVNO, then the service for the other MVNOs will be inevitably affected.

Although the traffic of the MVNOs can be controlled by limiting the numbers of physical ports accessible to the MVNO in network deployment, this may be controlled at a large granularity and low precision without treating an MVNO subscriber differentially from the other MVNO subscribers.

SUMMARY

Embodiments of the invention provide a method and device for controlling a network capacity so that an MNO may control an access of an MVNO to an MNO network accurately according to a capacity granted for the MVNO to thereby avoid the network of the MNO from being affected because MNO network resources are overused by the MVNO in operation.

An embodiment of the invention provides a method for controlling a network capacity, the method including:

receiving an instruction message for setting up an IP Connectivity Access network (IP-CAN) session for a User Equipment (UE), obtaining a UE identifier from the instruction message, and determining from the UE identifier a Mobile Virtual Network Operator (MVNO) serving the UE corresponding to the UE identifier;

forwarding the IP-CAN session setup instruction message to a Policy and Charging Rule Function (PCRF) in the MVNO (MVNO-PCRF), the MVNO serving the UE;

receiving an IP-CAN session setup acknowledgement message carrying a Policy and Charging Control (PCC) rule of the UE, sent by the MVNO-PCRF; and replying to a network element sending the instruction message, with the IP-CAN session setup acknowledgment message for the UE upon determining according to the PCC rule of the UE that the MVNO serving the UE does not exceed a granted capacity of the MVNO.

As can be apparent from the solution above, the MNO can control conveniently an access of the MVNO to the MNO network accurately according to the capacity granted for the MVNO, to thereby avoid the network of the MNO from being affected because MNO network resources are overused by the MVNO in operation.

Preferably replying to the network element sending the instruction message, with the IP-CAN session setup acknowledgment message for the UE upon determining according to the PCC rule of the UE that the MVNO serving the UE does not exceed the granted capacity of the MVNO includes:

determining, by a Mobile Network Operator Policy and Charging Rule Function (MNO-PCRF), according to the PCC rule of the UE through a preset Mobile Network Operator Bandwidth Control Function (MNO-MBCF) whether the MVNO serving the UE exceeds the granted capacity of the MVNO, and replying to a network element sending the instruction message, with the IP-CAN session setup acknowledgment message for the UE upon determining that the MVNO serving the UE does not exceed the granted capacity of the MVNO.

Preferably determining, by the MNO-PCRF, according to the PCC rule of the UE through the preset Mobile Network Operator Bandwidth Control Function (MNO-MBCF) whether the MVNO serving the UE exceeds the granted capacity of the MVNO includes:

extracting Quality of Service (QoS) information of the UE from the PCC rule of the UE, and sending the QoS information to the preset MNO-MBCF, so that the MNO-MBCF extracts a bandwidth granted for the UE by the MVNO serving the UE, included in the QoS information of the UE, determining the sum of a bandwidth used by the MVNO serving the UE and the bandwidth granted for the UE by the MVNO, and determining whether the sum is more than the granted capacity of the MVNO serving the UE, and if so, then the MNO-PCRF receiving an alert fed back by the MNO-MBCF that the granted capacity of the MVNO serving the UE is exceeded; otherwise, the MNO-PCRF receiving an alert fed back by the MNO-MBCF that a condition for setting up an IP-CAN session for the UE is satisfied.

As can be apparent, the bandwidth of the UE is granted from the MVNO-PCRF instead of the MNO-PCRF, so the MVNO operates separately from the MNO.

Preferably the method further includes: sending to the MVNO-PCRF an alert that the granted capacity of the MVNO serving the UE is exceeded, upon determining according to the PCC rule of the UE that the MVNO serving the UE exceeds the granted capacity of the MVNO. Thus it can be determined accurately whether the network capacity used by the MVNO serving the UE exceeds the granted network capacity, to thereby avoid a service to the other MVNOs from being affected after the network capacity used by the MVNO exceeds its granted network capacity.

Preferably after the alert is sent to the MVNO-PCRF that the granted capacity of the MVNO serving the UE is exceeded, the method further includes:

starting a preset wait timer;

if a new PCC rule of the UE sent from the MVNO-PCRF is received before the wait timer expires, then determining again according to the new PCC rule of the UE whether the MVNO serving the UE exceeds the granted capacity of the MVNO; and if no new PCC rule of the UE sent by the MVNO-PCRF is received before the wait timer expires, then replying to the network element sending the instruction message, with an IP-CAN session setup failure message for the UE.

The timer is started so that if the MVNO-PCRF makes no response, then the MVNO-PCRF can proceed instead of waiting.

A new PCC rule of the UE is sent.

Preferably the method further includes: receiving a new PCC rule of the UE sent by the MVNO-PCRF, when an IP-CAN session is set up for the UE and the IP-CAN session which is set up for the UE needs to be modified, determining according to the PCC rule of the UE whether the MVNO serving the UE exceeds the granted capacity of the MVNO, and if so, then requesting again the MVNO-PCRF for a new PCC rule of the UE; otherwise, modifying the IP-CAN session which is set up for the UE, using the new PCC rule of the UE.

Thus it is determined again according to the new PCC rule of the UE sent by the MVNO-PCRF whether the MVNO serving the UE exceeds the granted capacity of the MVNO so that the MNO can control the capacity of the MVNO more accurately.

Preferably the method further includes:

receiving an instruction message to terminate an IP-CAN session which is set up for the UE, when the IP-CAN session is set up for the UE and the IP-CAN session which is set up for the UE needs to be terminated;

forwarding the instruction message to terminate the IP-CAN session which is set up for the UE, to the MVNO-PCRF; and updating the sum of granted bandwidths of all the UEs served by the MVNO serving the UE upon reception of an acknowledgment message for terminating the IP-CAN session which is setup for the UE, replied with by the MVNO-PCRF.

Thus the MNO-MBCF can determine against the new granted capacity of the MVNO whether the network capacity used by the MVNO exceeds its granted network capacity.

Preferably updating the sum of granted bandwidths of all the UEs served by the MVNO serving the UE includes:

sending to a preset MNO-MBCF a message to terminate the IP-CAN session which is set up for the UE, so that the preset MNO-MBCF updates the sum of granted bandwidths of all the UEs served by the MVNO serving the UE.

Thus if the IP-CAN session of the UE is terminated, then the UE of the MVNO releases its occupied bandwidth for use by another UE.

An embodiment of the invention provides a method for providing a Policy and Charging Control (PCC) rule, the method including:

receiving, by an MVNO-PCRF, an instruction message for setting up an IP Connectivity Access network (IP-CAN) session for a User Equipment (UE), sent by a Mobile Network Operator Policy and Charging Rule Function (MNO-PCRF); and determining a PCC rule of the UE from the instruction message, and sending to the MNO-PCRF an IP-CAN session setup acknowledgement message carrying the PCC rule of the UE.

As can be apparent from the solution above, the PCC rule is provided by the MVNO-PCRF, so the MVNO operates separately from the MNO.

Preferably the method further includes:

receiving an alert sent by the MNO-PCRF that a granted capacity of an MVNO serving the UE is exceeded; and allocating again a new PCC rule for the UE in response to the alert, and sending the new PCC rule to the MNO-PCRF.

Thus the MVNO can attempt on allocate a number of PCC rules instead of one PCC rule, so the IP-CAN process can succeed at a higher probability.

Preferably the method further includes:

allocating again a new PCC rule for the UE, and sending the new PCC rule to the MNO-PCRF, when an IP-CAN session which is set up for the UE needs to be modified.

Thus the new PCC rule is allocated again for the UE so that the MNO-MBCF can check granted resources for the MVNO serving the UE.

Preferably the method further includes:

receiving an instruction message sent by the MNO-PCRF to terminate an IP-CAN session which is set up for the UE, when the IP-CAN session which is set up for the UE needs to be terminated, and determining the PCC rule corresponding to the UE from the instruction message; and sending to the MNO-PCRF an acknowledgement message to terminate the IP-CAN session which is set up for the UE.

Thus the IP-CAN session which is set up for the UE can be terminated.

An embodiment of the invention provides a device for controlling a network capacity, the device including:

an MVNO determining unit configured to receive an instruction message for setting up an IP Connectivity Access network (IP-CAN) session for a User Equipment (UE), to obtain a UE identifier from the instruction message, and to determine from the UE identifier a Mobile Virtual Network Operator (MVNO) serving the UE corresponding to the UE identifier;

a message forwarding unit configured to forward the IP-CAN session setup instruction message to a Policy and Charging Rule Function (PCRF) in the MVNO (MVNO-PCRF), the MVNO serving the UE;

a message receiving unit configured to receive an IP-CAN session setup acknowledgement message carrying a Policy and Charging Control (PCC) rule of the UE, sent by the MVNO-PCRF; and a determining unit configured to reply to a network element sending the instruction message, with the IP-CAN session setup acknowledgment message for the UE upon determining according to the PCC rule of the UE that the MVNO serving the UE does not exceed a granted capacity of the MVNO.

Preferably the determining unit is configured to determine according to the PCC rule of the UE through a preset Mobile Network Operator Bandwidth Control Function (MNO-MBCF) whether the MVNO serving the UE exceeds the granted capacity of the MVNO. Thus the MNO-MBCF logic entity globally positioned in the network architecture can readily control the traffic of the MVNO.

Preferably the determining unit configured to determine according to the PCC rule of the UE through the preset Mobile Network Operator Bandwidth Control Function (MNO-MBCF) whether the MVNO serving the UE exceeds the granted capacity of the MVNO is configured:

to extract Quality of Service (QoS) information of the UE from the PCC rule of the UE, and to send the QoS information to the preset MNO-MBCF, so that the MNO-MBCF obtains a bandwidth granted for the UE by the MVNO serving the UE, included in the QoS information of the UE, determines the sum of a bandwidth used by the MVNO serving the UE and the bandwidth granted for the UE by the MVNO, and determines whether the sum is more than the granted capacity of the MVNO serving the UE, and if so, to receive an alert fed back by the MNO-MBCF that the granted capacity of the MVNO serving the UE is exceeded; otherwise, to receive an alert fed back by the MNO-MBCF that a condition for setting up an IP-CAN session for the UE is satisfied.

Thus it can be determined accurately whether the network capacity used by the MVNO serving the UE exceeds the granted network capacity, to thereby avoid a service to the other MVNOs from being affected after the network capacity used by the MVNO exceeds its granted network capacity.

Preferably the determining unit is further configured to trigger the message forwarding unit to send to the MVNO-PCRF an alert that the granted capacity of the MVNO serving the UE is exceeded, upon determining according to the PCC rule of the UE that the MVNO serving the UE exceeds the granted capacity of the MVNO. Thus it can be determined accurately whether the network capacity used by the MVNO serving the UE exceeds the granted network capacity, to thereby avoid a service to the other MVNOs from being affected after the network capacity used by the MVNO exceeds its granted network capacity.

Preferably after the message forwarding unit sends to the MVNO-PCRF the alert that the granted capacity of the MVNO serving the UE is exceeded, the device further includes:

a waiting unit configured to start a preset wait timer, and if a new PCC rule of the UE forwarded by the message forwarding unit is received before the wait timer expires, to trigger the determining unit to determine again according to the new PCC rule of the UE whether the MVNO serving the UE exceeds the granted capacity of the MVNO; and if no new PCC rule of the UE sent by the MVNO-PCRF is received before the wait timer expires, to reply to the network element sending the instruction message, with an IP-CAN session setup failure message for the UE.

The timer is started so that if the MVNO-PCRF makes no response, then the MVNO-PCRF can proceed instead of waiting.

Preferably the determining unit is further configured to receive a new PCC rule of the UE sent by the MVNO-PCRF, when an IP-CAN session is set up for the UE, and the IP-CAN session which is set up for the UE needs to be modified, to determine according to the new PCC rule of the UE whether the MVNO serving the UE exceeds the granted capacity of the MVNO, and if so, to request again the MVNO-PCRF for a new PCC rule of the UE; otherwise, to modify the IP-CAN session which is set up for the UE, using the new PCC rule of the UE. Thus it is determined again against the new PCC rule of the UE sent by the MVNO-PCRF whether the MVNO serving the UE exceeds the granted capacity of the MVNO so that the MNO can control the capacity of the MVNO more accurately.

Preferably the message receiving unit is further configured to receive an instruction message to terminate an IP-CAN session which is set up for the UE, when the IP-CAN session is set up for the UE, and the IP-CAN session which is set up for the UE needs to be terminated;

the message forwarding unit is further configured to forward the instruction message to terminate the IP-CAN session which is set up for the UE, to the MVNO-PCRF; and the determining unit is further configured to update the sum of granted bandwidths of all the UEs served by the MVNO serving the UE when the message receiving unit receives an acknowledgment message for terminating the IP-CAN session which is setup for the UE, replied with by the MVNO-PCRF.

Thus the MNO-MBCF can determine against the new granted capacity of the MVNO whether the network capacity used by the MVNO exceeds its granted network capacity.

Preferably the determining unit configured to update the sum of granted bandwidths of all the UEs served by the MVNO serving the UE is configured to trigger the message forwarding unit to send to a preset MNO-MBCF a message to terminate the IP-CAN session which is set up for the UE, so that the preset MNO-MBCF updates the sum of granted bandwidths of all the UEs served by the MVNO serving the UE.

An embodiment of the invention further provides a device for providing a Policy and Charging Control (PCC) rule, the device including:

a message receiving unit configured to receive an instruction message for setting up an IP Connectivity Access network (IP-CAN) session for a User Equipment (UE), sent by a Mobile Network Operator Policy and Charging Rule Function (MNO-PCRF); and a PCC determining unit configured to determine a PCC rule of the UE from the instruction message, and to send to the MNO-PCRF an IP-CAN session setup acknowledgement message carrying the PCC rule of the UE.

Preferably the message receiving unit is configured to receive an alert sent by the MNO-PCRF that a granted capacity of an MVNO serving the UE is exceeded; and the PCC determining unit is configured to allocate again a new PCC rule for the UE in response to the alert, and to send the new PCC rule to the MNO-PCRF.

Thus different PCC rules are allocated for different UEs so that the MVNO can treat a UE differentially from another UE.

Preferably the PCC determining unit is further configured to allocate again a new PCC rule for the UE, and to send the new PCC rule to the MNO-PCRF, when an IP-CAN session which is set up for the UE needs to be modified. Thus the new PCC rule is allocated again for the UE so that the MNO-MBCF can check granted resources for the MVNO serving the UE.

Preferably the message receiving unit is further configured to receive an instruction message sent by the MNO-PCRF to terminate an IP-CAN session which is set up for the UE, when the IP-CAN session which is set up for the UE needs to be terminated, and the PCC determining unit is further configured to determine the PCC rule corresponding to the UE from the instruction message, and to send to the MNO-PCRF an acknowledgement message to terminate the IP-CAN session which is set up for the UE.

Thus the IP-CAN session which is set up for the UE can be terminated.

DETAILED DESCRIPTION OF THE EMBODIMENTS

Embodiments of the invention provide a method and device for controlling a network capacity so as to enable an MNO to control an access of an MVNO to an MNO network accurately according to a capacity granted for the MVNO, to thereby avoid the network of the MNO from being affected because MNO network resources are overused by the MVNO in operation.

Figure 1:
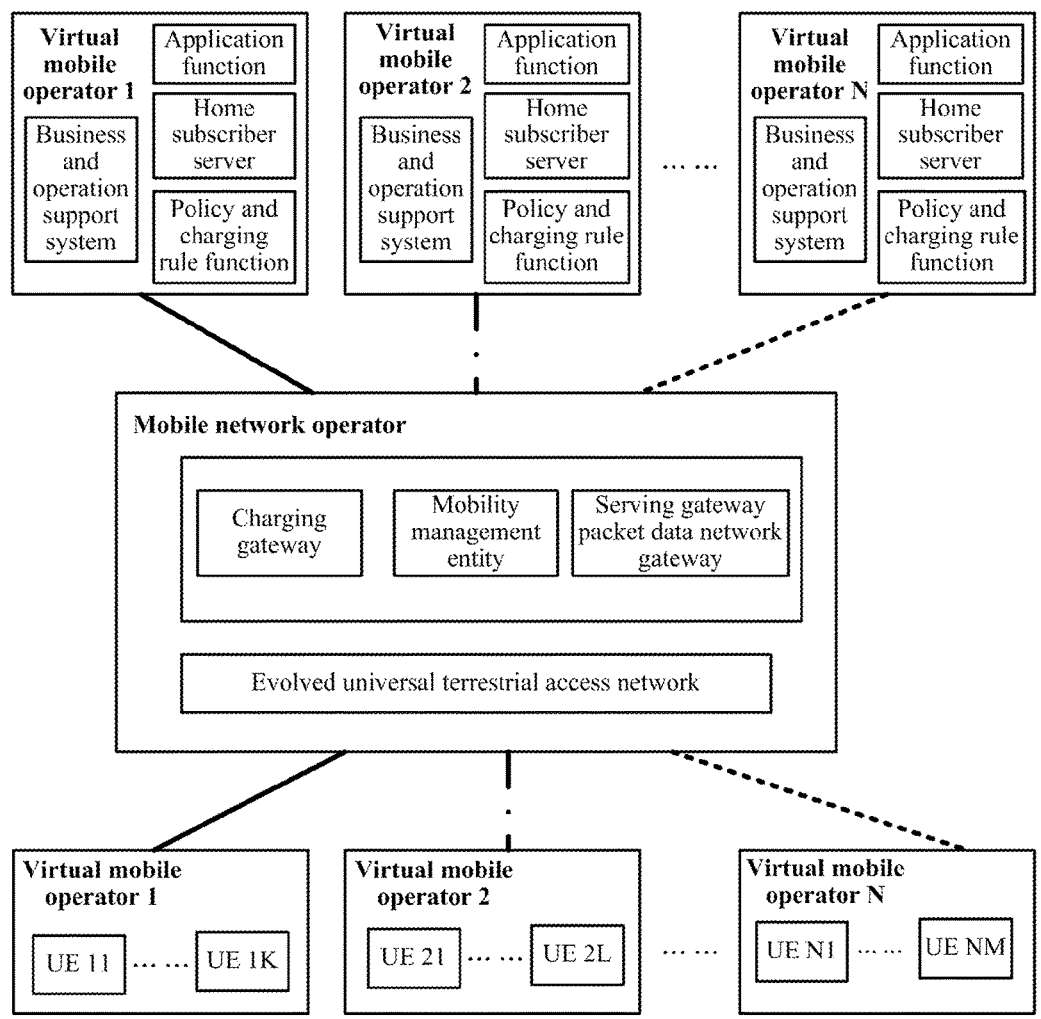
FIG. 1 is a structural diagram of a virtual operator network.
Figure 2:
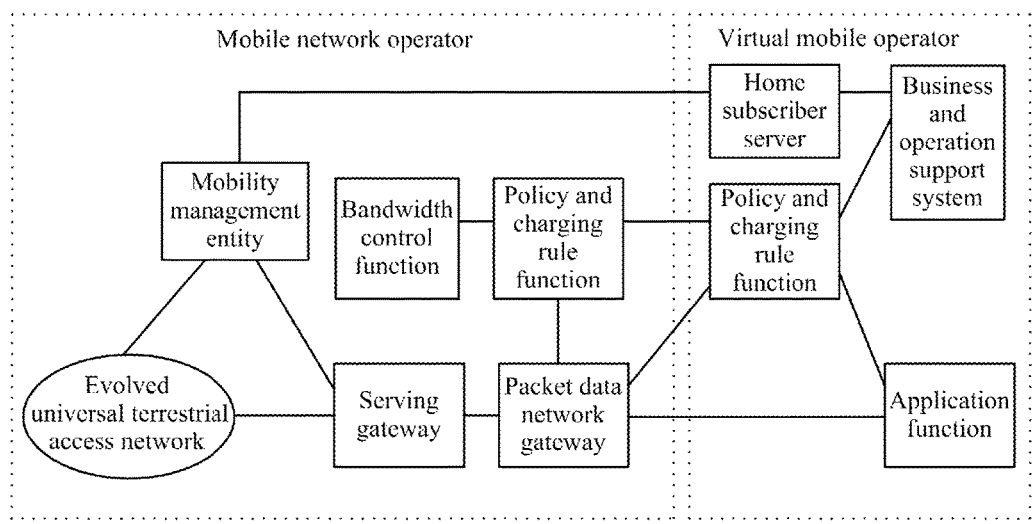
FIG. 2 is a schematic diagram of a network architecture according to an embodiment of the invention.

As illustrated in FIG. 2, in an embodiment of the invention, a PCRF device (denoted as an MNO-PCRF) is added to the shared network resources of the MNO in the existing virtual operator network architecture, where the MNO-PCRF device is connected with PCRF devices of the respective MVNOs (denoted MVNO-PCRFs) and also with a P-GW device of the MNO (denoted as an MNO-P-GW). Moreover an MVNO Bandwidth Control Function (MBCF) (denoted as an MNO-MBCF) logic entity is further added, where the logic entity can be deployed separately, or can be integrated in the MNO-PCRF device, and the logic entity is logically connected with the MNO-PCRF device.

In FIG. 2, the MBCF logic entity generally functions to maintain in real time usage conditions of the respective MVNOs to the network resources in the MNO (it needs to be initialized before it is started), and to judge whether current network capacities used by the MVNOs exceed their granted network capacities. The MNO-PCRF generally functions to determine an MVNO serving a user equipment according to the identifier of the user equipment, to be an agent to request for a Policy and Charging Control (PCC) message to the MVNO-PCRF, and to be an agent to provide the P-GW with the PCC message. Moreover the MNO-PCRF is further responsible for extracting Quality of Service (QoS) information from a PCC rule of the MVNO-PCRF, and for interacting with the MBCF logic entity to control together traffic of the MVNO. Particularly the traffic of the MVNO is controlled in processes of setting up, modifying, terminating, etc., an IP Connectivity Access Network (IP-CAN) session.

Figure 3:
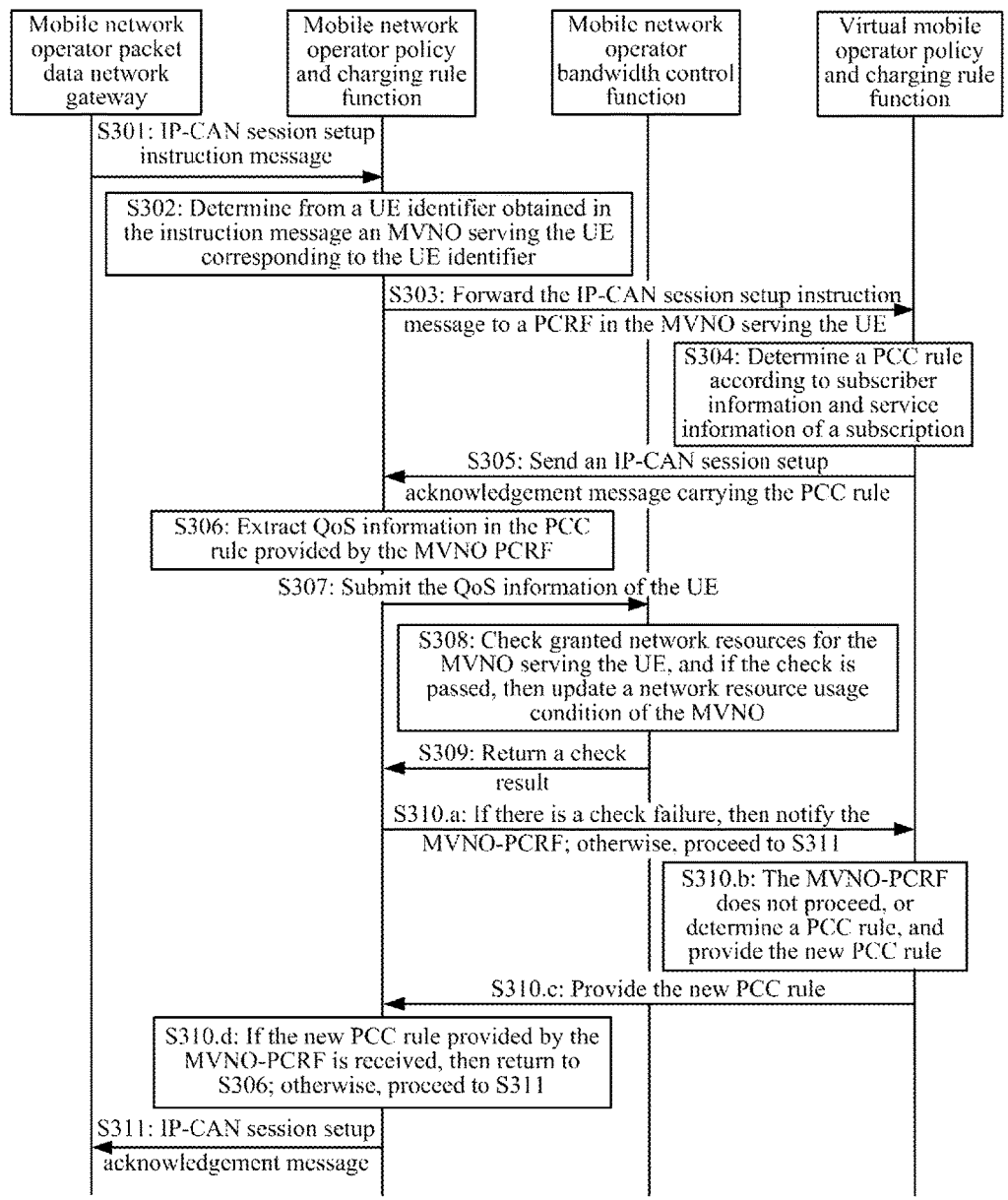
FIG. 3 is a schematic diagram of a process of setting up an IP-CAN session according to an embodiment of the invention.

The method according to the invention will be described below in details in particular embodiments thereof, and as illustrated in FIG. 3, a process of setting up an IP-CAN session according to a particular embodiment of the invention particularly includes:

S301. A Mobile Network Operator Packet data network Gateway (MNO-P-GW) sends to an MNO-PCRF an instruction message for setting up an IP Connectivity Access Network (IP-CAN) session for a User Equipment (UE);

S302. The MNO-PCRF determines, from a UE identifier obtained in the instruction message, a mobile Virtual Network Operator (MVNO) serving the UE corresponding to the UE identifier;

S303. The MNO-PCRF forwards the IP-CAN session setup instruction message to a Policy and Charging Rule Function (PCRF) unit of the MVNO serving the UE (i.e., an MVNO-PCRF);

S304. The MVNO-PCRF determines a PCC rule of the UE according to subscriber information and service information of a subscription;

S305. The MVNO-PCRF sends to the MNO-PCRF an IP-CAN session setup acknowledgement message carrying the Policy and Charging Control (PCC) rule of the UE;

S306. The MNO-PCRF extracts Quality of Service (QoS) information from the PCC rule provided by the MVNO PCRF;

S307. The MNO-PCRF provides the QoS information of the UE to the MNO-MBCF;

S308-S309: The MNO-MBCF obtains a bandwidth granted by the MVNO for the UE included in the QoS information of the UE, determines the sum of a bandwidth used by the MVNO serving the UE and the bandwidth granted by the MVNO for the UE, and determines whether the sum is more than a granted capacity of the MVNO serving the UE, and if so, then an alert fed back by the MNO-MBCF that the granted capacity of the MVNO serving the UE is exceeded; otherwise, the MNO-MBCF feeds back to the MNO-PCRF an alert that the granted capacity of the MVNO serving the UE satisfies a condition for setting up an IP-CAN session for the UE;

The granted bandwidth of the UE is the bandwidth allocated by the MVNO PCRF for the UE;

S310a-d. If there is a check success, then the flow proceeds to S311; otherwise the MNO-PCRF notifies the MVNO-PCRF of a check failure, and if the MNO-PCRF receives a new PCC rule of the UE sent by the MVNO-PCRF before the wait timer expires, then the MNO-PCRF judges again according to the new PCC rule of the UE whether the MVNO serving the UE exceeds the granted capacity of the MVNO, that is, it proceeds to S306; and if the MNO-PCRF does not receive any PCC rule of the UE sent by the MVNO-PCRF before the wait timer expires, then the MNO-PCRF replies to the Mobile Network Operator Packet data network Gateway MNO-P-GW sending the instruction message, with an IP-CAN session setup failure message for the UE; and S311. The MNO-PCRF sends an IP-CAN session setup acknowledgement message.

Following the method above, by way of an example, if some MVNO purchases a bandwidth of 1G from the MNO, that is, the MNO grants a capacity of 1G for the MVNO, then the sum of network bandwidths occupied concurrently by all the active UEs served by the MVNO shall not exceed 1G.

Figure 4:
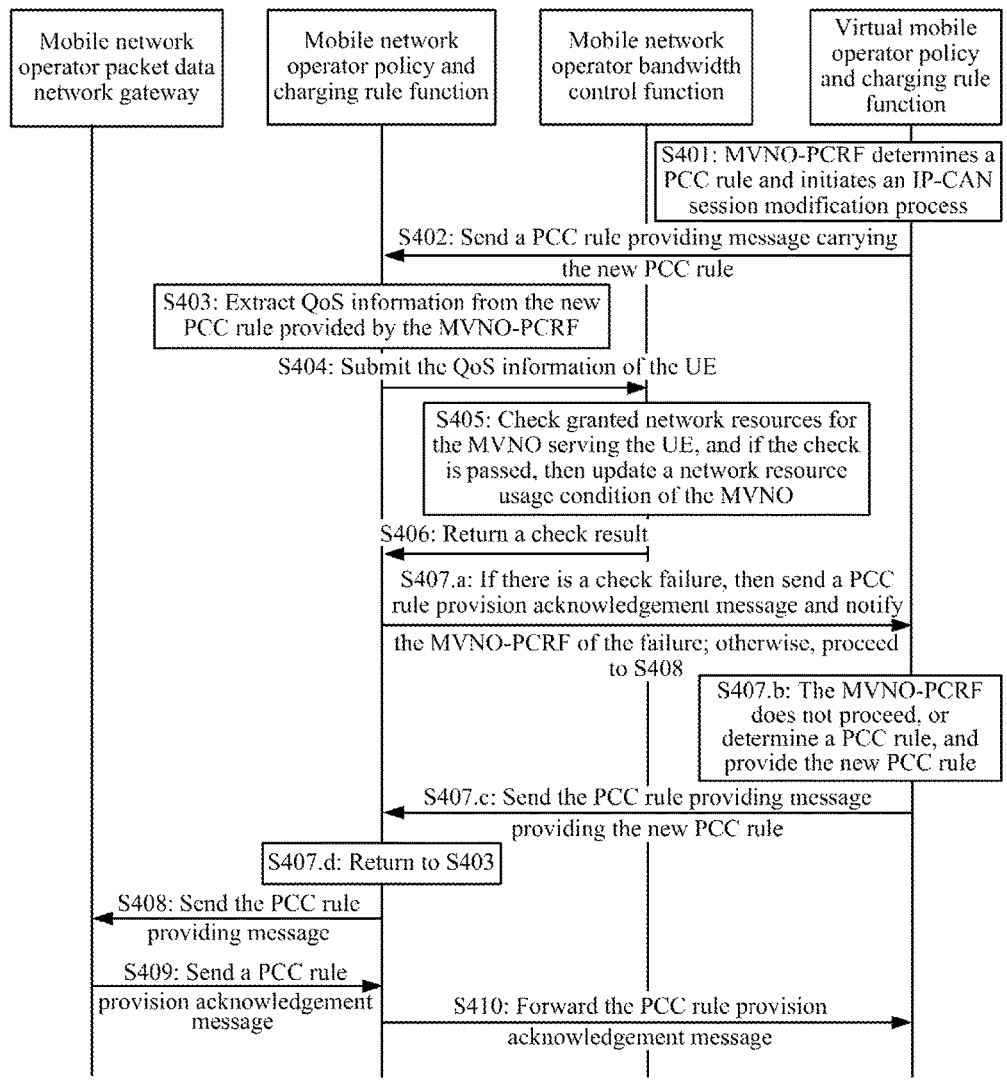
FIG. 4 is a schematic diagram of a process of modifying an IP-CAN session according to an embodiment of the invention.

As illustrated in FIG. 4, a process of modifying an IP-CAN session according to a particular embodiment of the invention particularly includes:

S401. The MVNO-PCRF determines the PCC rule of the UE according to the UE information and the service information of the subscription, and initiates a process of modifying an IP-CAN session;

S402. The MVNO-PCRF sends a PCC rule provision message carrying a new PCC rule to the MNO-PCRF;

S403. The MNO-PCRF extracts QoS information from the new PCC rule provided by the MVNO-PCRF;

S404. The MNO-PCRF submits the QoS information of the UE to the MNO-MBCF;

S405. The MNO-MBCF extracts a bandwidth granted by the MVNO for the UE, included in the QoS information of the UE, determines the sum of a bandwidth used by the MVNO serving the UE and the bandwidth granted by the MVNO for the UE, and determines whether the sum is more than a granted capacity of the MVNO serving the UE, and if so, then the MNO-MBCF feeds back to the MNO-PCRF an alert that the granted capacity of the MVNO serving the UE is exceeded; otherwise, the MNO-MBCF feeds back to the MNO-PCRF an alert that the granted capacity of the MVNO serving the UE satisfies a condition for modifying an IP-CAN session for the UE;

S406. The MNO-MBCF returns a check result to the MNO-PCRF;

S407a-d. If there is a check success, then the process proceeds to S408; otherwise the MNO-PCRF sends a PCC rule provision acknowledgement message to the MVNO-PCRF to notify the MVNO-PCRF of a check failure, and starts a timer; and if the MNO-PCRF receives a new PCC rule provided by the MVNO-PCRF before the timer expires, then it stops the timer, and thereafter proceeds to S403. If the timer expires, then the process proceeds to S408. if the MVNO-PCRF receives a check failure message, then it may not proceed, or may determine a PCC rule again, and provide the MNO-PCRF with a new PCC rule, particularly dependent upon an implementation policy of the MVNO-PCRF;

S408. The MVNO-PCRF forwards the PCC rule provision message to the P-GW;

S409. The P-GW sends a PCC rule provision acknowledgement message to the MNO-PCRF; and S410. The MNO-PCRF forwards the PCC rule provision acknowledgement message to the MNO-PCRF.

Figure 5:
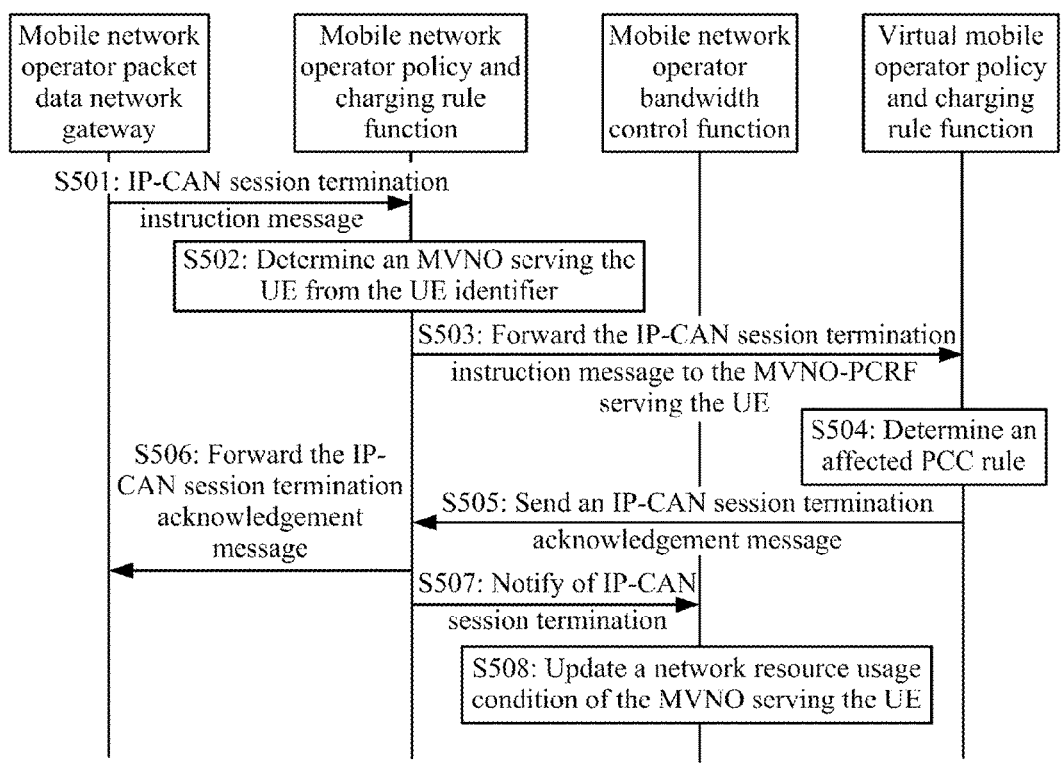
FIG. 5 is a schematic diagram of a process of terminating an IP-CAN session according to an embodiment of the invention.

As illustrated in FIG. 5, a flow of terminating an IP-CAN session according to a particular embodiment of the invention particularly includes:

S501. The MNO-P-GW sends an IP-CAN session termination instruction message to the MNO-PCRF;

S502. The MNO-PCRF receives the IP-CAN session termination instruction message sent by the MNO-P-GW, and determines the Mobile Virtual Network Operator (MVNO) serving the UE corresponding to a UE identifier according to the UE identifier obtained in the instruction message;

S503. The MNO-PCRF forwards the IP-CAN session termination instruction message to the MVNO-PCRF serving the UE;

S504. The MVNO-PCRF determines a PCC rule affected;

S505. The MVNO-PCRF sends an IP-CAN session termination acknowledgment message to the MNO-PCRF;

S506. The MNO-PCRF forwards the IP-CAN session termination acknowledgment message to the MNO-P-GW;

S507. The MNO-PCRF sends an IP-CAN session termination message to the MNO-MBCF; and S508. The MNO-MBCF updates a network resource usage condition of the MVNO serving the UE, particularly as follows: the MNO-MBCF extracts a bandwidth granted by the MVNO for the UE, included in the QoS information of the UE, determines the sum of a bandwidth used by the MVNO serving the UE and the bandwidth granted by the MVNO for the UE, and determines whether the sum is more than a granted capacity of the MVNO serving the UE, and if so, then the MNO-MBCF feeds back an alert to the MNO-PCRF that the granted capacity of the MVNO serving the UE is exceeded; otherwise, the MNO-MBCF feeds back to the MNO-PCRF an alert that the granted capacity of the MVNO serving the UE satisfies a condition for terminating an IP-CAN session for the UE.

In the step S504, after the MVNO-PCRF determines the affected PCC rule, the PCRF may further act, for example, after the IP-CAN is terminated, the P-GW reports traffic used by the UE, the PCRF notifies the SPR of the traffic, and the SPR records and accumulates the historical traffic, as known in the prior art, so a repeated description thereof will be omitted here.

Figure 6:
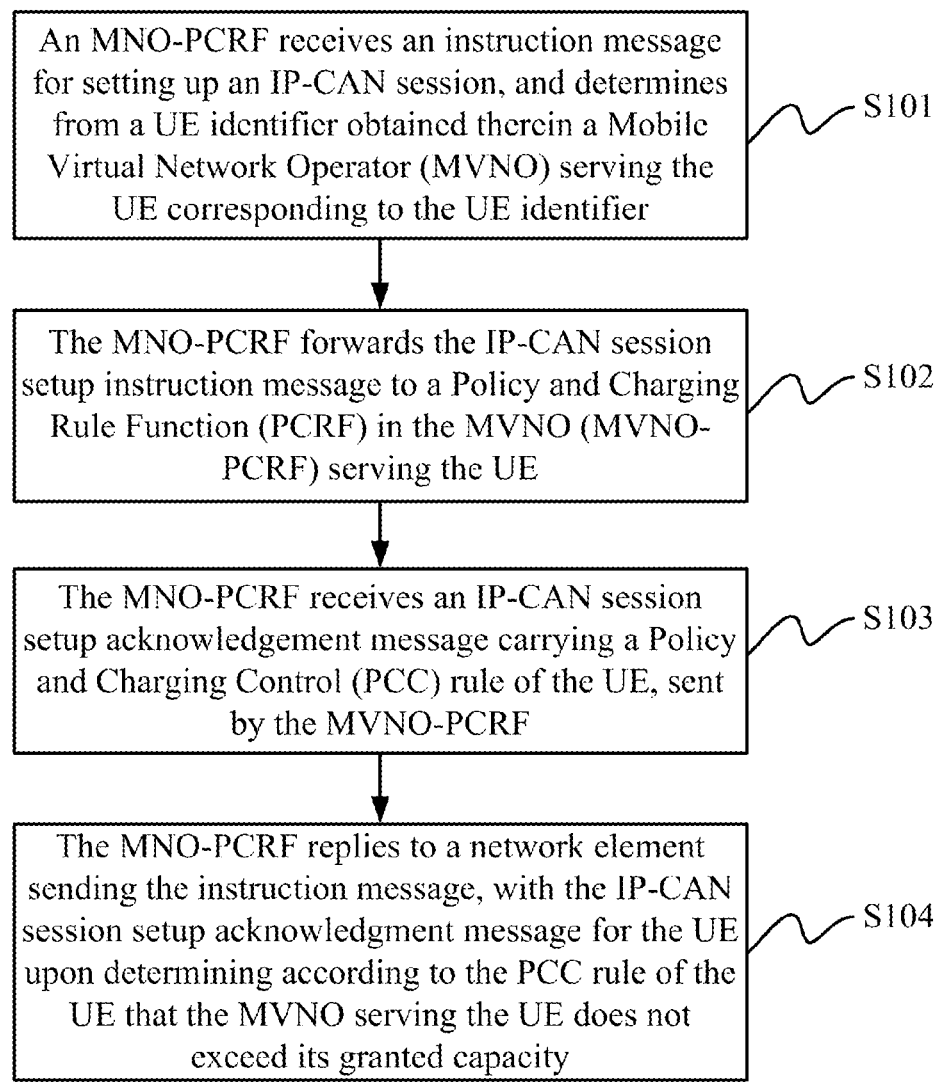
FIG. 6 is a schematic flow chart of a method for controlling a network capacity according to an embodiment of the invention.

In summary, as illustrated in FIG. 6, a method for controlling a network capacity at the MNO-PCRF side according to an embodiment of the invention includes:

S101. An MNO-PCRF receives an instruction message for setting up an IP Connectivity Access network (IP-CAN) session for a User Equipment (UE), and determines from a UE identifier obtained in the instruction message a Mobile Virtual Network Operator (MVNO) serving the UE corresponding to the UE identifier;

S102. The MNO-PCRF forwards the IP-CAN session setup instruction message to a Policy and Charging Rule Function (PCRF) in the MVNO (MVNO-PCRF), the MVNO serving the UE;

S103. The MNO-PCRF receives an IP-CAN session setup acknowledgement message carrying a Policy and Charging Control (PCC) rule of the UE, sent by the MVNO-PCRF; and S104. The MNO-PCRF replies to a network element sending the instruction message, with the IP-CAN session setup acknowledgment message for the UE upon determining according to the PCC rule of the UE that the MVNO serving the UE does not exceed a granted capacity of the MVNO.

With the solution according to the invention, the MNO can control an access of the MVNO to the MNO network accurately according to the capacity granted for the MVNO, to thereby avoid the network of the MNO from being affected because MNO network resources are overused by the MVNO in operation.

Figure 7:
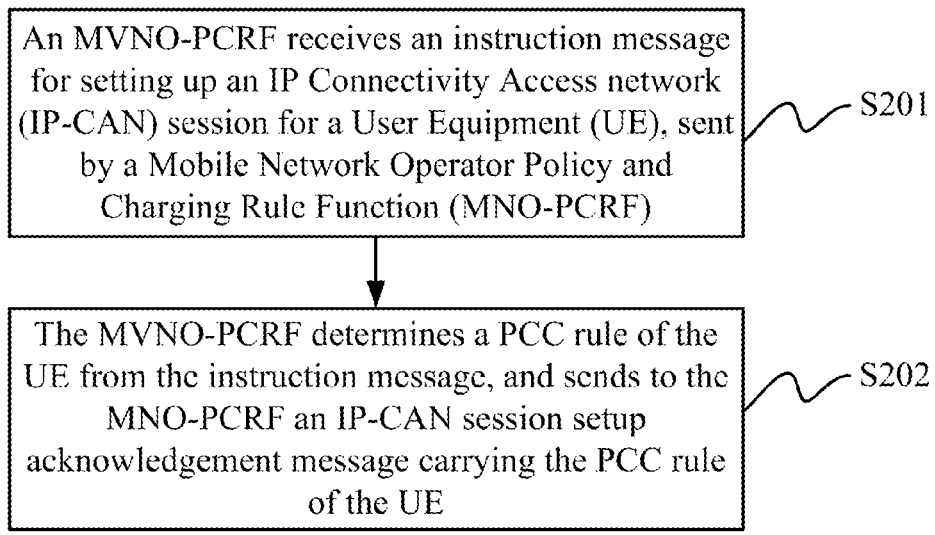
FIG. 7 is a schematic flow chart of a method for providing a Policy and Charging Control (PCC) rule according to an embodiment of the invention.

As illustrated in FIG. 7, a method for controlling a network capacity at the MVNO-PCRF side according to an embodiment of the invention includes:

S201. An MVNO-PCRF receives an instruction message for setting up an IP Connectivity Access network (IP-CAN) session for a User Equipment (UE), sent by a Mobile Network Operator Policy and Charging Rule Function (MNO-PCRF); and S202. The MVNO-PCRF determines a PCC rule of the UE from the instruction message, and sends to the MNO-PCRF an IP-CAN session setup acknowledgement message carrying the PCC rule of the UE.

Figure 8:
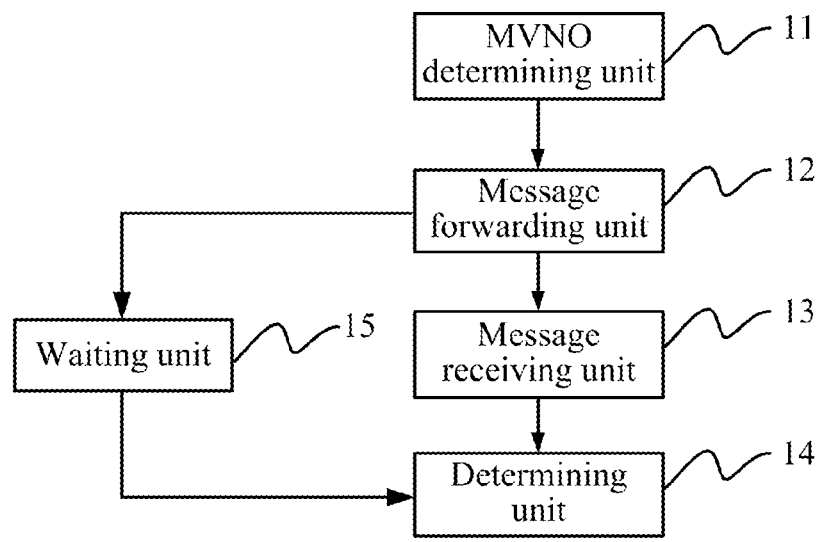
FIG. 8 is a schematic structural diagram of a device for controlling a network capacity according to an embodiment of the invention.

As illustrated in FIG. 8, a device for controlling a network capacity according to an embodiment of the invention includes:

An MVNO determining unit 11 is configured to receive an instruction message for setting up an IP Connectivity Access network (IP-CAN) session for a User Equipment (UE), and to determine a Mobile Virtual Network Operator (MVNO) serving the UE corresponding to a UE identifier from the UE identifier obtained in the instruction message;

A message forwarding unit 12 is configured to forward the IP-CAN session setup instruction message to a Policy and Charging Rule Function (PCRF) in the MVNO (MVNO-PCRF), the MVNO serving the UE;

A message receiving unit 13 is configured to receive an IP-CAN session setup acknowledgement message carrying a Policy and Charging Control (PCC) rule of the UE, sent by the MVNO-PCRF; and A determining unit 14 is configured to reply to a network element sending the instruction message, with the IP-CAN session setup acknowledgment message for the UE upon determining according to the PCC rule of the UE that the MVNO serving the UE does not exceed a granted capacity of the MVNO.

Preferably the device further includes:

A waiting unit 15 is configured to start a preset wait timer after the message forwarding unit 12 sends to the MVNO-PCRF the alert that the granted capacity of the MVNO serving the UE is exceeded, and if a new PCC rule of the UE forwarded by the message forwarding unit 12 is received before the wait timer expires, to trigger the determining unit 14 to determine again according to the new PCC rule of the UE whether the MVNO serving the UE exceeds the granted capacity of the MVNO; and if no new PCC rule of the UE sent by the MVNO-PCRF is received before the wait timer expires, to reply to the network element sending the instruction message, with an IP-CAN session setup failure message for the UE.

The device for controlling a network capacity can be an MNO-PCRF, where the MVNO determining unit 11, the determining unit 14, and the waiting unit 15 can be processors or other devices, and the message forwarding unit 12 and the message receiving unit 13 can be embodied as transceiving component capable of transmitting and receiving messages, e.g., by transmitting them through coupled connection, etc.

Figure 9:
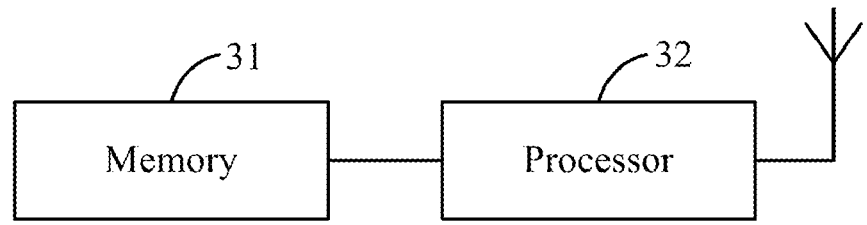
FIG. 9 is a schematic structural diagram of another device for controlling a network capacity according to an embodiment of the invention.

As illustrated in FIG. 9, another device for controlling a network capacity according to an embodiment of the invention includes a memory 31 and a processor 32, where the processor 32 is configured with a computer program, etc., for performing the flow of the method for controlling a network capacity according to the embodiment above of the invention, so that the MNO can function conveniently to control an access of the MVNO to the MNO network accurately according to the capacity granted for the MVNO to thereby avoid the network of the MNO from being affected because MNO network resources are overused by the MVNO in operation; the memory 31 is configured to store codes of the computer program to configure the processor 32; and the processor 32 can include a baseband processing component, a radio frequency processing component, and other components as needed in reality to transmit related information. Particularly:

The processor 32 is configured to receive an instruction message for setting up an IP Connectivity Access network (IP-CAN) session for a User Equipment (UE), and to determine from a UE identifier obtained in the instruction message a Mobile Virtual Network Operator (MVNO) serving the UE corresponding to the UE identifier;

The processor 32 is configured to forward the IP-CAN session setup instruction message to a Policy and Charging Rule Function (PCRF) in the MVNO (MVNO-PCRF), the MVNO serving the UE;

The processor 32 is configured to receive an IP-CAN session setup acknowledgement message carrying a Policy and Charging Control (PCC) rule of the UE, sent by the MVNO-PCRF; and The processor 32 is configured to reply to a network element sending the instruction message, with the IP-CAN session setup acknowledgment message for the UE upon determining according to the PCC rule of the UE that the MVNO serving the UE does not exceed a granted capacity of the MVNO.

Preferably the processor 32 is configured to determine according to the PCC rule of the UE through a preset Mobile network operator Bandwidth Control Function (MBCF) whether the MVNO serving the UE does not exceed the granted capacity of the MVNO.

Preferably the processor 32 configured to determine according to the PCC rule of the UE through the preset Mobile network operator Bandwidth Control Function (MBCF) whether the MVNO serving the UE does not exceed the granted capacity of the MVNO is configured:

To extract Quality of Service (QoS) information of the UE from the PCC rule of the UE, and to send the QoS information to the preset MNO-MBCF, so that the MNO-MBCF obtains a bandwidth granted for the UE by the MVNO serving the UE, included in the QoS information of the UE, determines the sum of a bandwidth used by the MVNO serving the UE and the bandwidth granted by the MVNO for the UE, and determines whether the sum is more than the granted capacity of the MVNO serving the UE, and if so, the MNO-MBCF feeds back an alert that the granted capacity of the MVNO serving the UE is exceeded; otherwise, the MNO-MBCF feeds back an alert that a condition for setting up an IP-CAN session for the UE is satisfied.

Preferably the processor 32 is further configured to trigger the message forwarding unit to send to the MVNO-PCRF an alert that the granted capacity of the MVNO serving the UE is exceeded, upon determining according to the PCC rule of the UE that the MVNO serving the UE exceeds the granted capacity of the MVNO.

Preferably the processor 32 is further configured to start a preset wait timer after the alert is sent to the MVNO-PCRF that the granted capacity of the MVNO serving the UE is exceeded, and if a new PCC rule of the UE is received before the wait timer expires, to determine again according to the new PCC rule of the UE whether the MVNO serving the UE exceeds the granted capacity of the MVNO; and if no new PCC rule of the UE sent by the MVNO-PCRF is received before the wait timer expires, to reply to the network element sending the instruction message, with an IP-CAN session setup failure message for the UE.

Preferably the processor 32 is further configured to receive a new PCC rule of the UE sent by the MVNO-PCRF, when an IP-CAN session is set up for the UE and the IP-CAN session which is set up for the UE needs to be modified, to determine according to the new PCC rule of the UE whether the MVNO serving the UE exceeds the granted capacity of the MVNO, and if so, to request again from the MVNO-PCRF for a new PCC rule of the UE; otherwise, to modify the IP-CAN session which is set up for the UE, using the new PCC rule of the UE.

Preferably the processor 32 is further configured to receive an instruction message to terminate an IP-CAN session which is set up for the UE, when the IP-CAN session is set up for the UE, and the IP-CAN session which is set up for the UE needs to be terminated; to forward the instruction message to terminate the IP-CAN session which is set up for the UE, to the MVNO-PCRF; and to update the sum of granted bandwidths of all the UEs served by the MVNO serving the UE upon reception of an acknowledgment message for terminating the IP-CAN session which is setup for the UE, replied by the MVNO-PCRF.

Preferably the processor 32 configured to update the sum of granted bandwidths of all the UEs served by the MVNO serving the UE is configured to send to a preset MNO-MBCF a message to terminate the IP-CAN session which is set up for the UE, so that the preset MNO-MBCF updates the sum of granted bandwidths of all the UEs served by the MVNO serving the UE.

Figure 10:
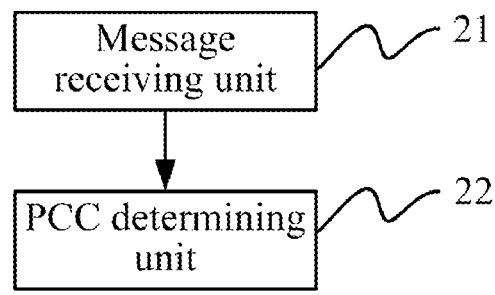
FIG. 10 is a schematic flow chart of a device for providing a Policy and Charging Control (PCC) rule according to an embodiment of the invention.

As illustrated in FIG. 10, a device for providing a Policy and Charging Control (PCC) rule according to an embodiment of the invention includes:

A message receiving unit 21 is configured to receive an instruction message for setting up an IP Connectivity Access network (IP-CAN) session for a User Equipment (UE), sent by a Mobile Network Operator Policy and Charging Rule Function (MNO-PCRF); and A PCC determining unit 22 is configured to determine a PCC rule of the UE from the instruction message, and to send to the MNO-PCRF an IP-CAN session setup acknowledgement message carrying the PCC rule of the UE.

The device for providing a PCC rule can be an MVNO-PCRF, where the message receiving unit 21 can be embodied as a transceiving component capable of transmitting and receiving a message, e.g., by transmitting it through coupled connection, etc. The PCC determining unit 22 can be a processor or another device.

Figure 11:
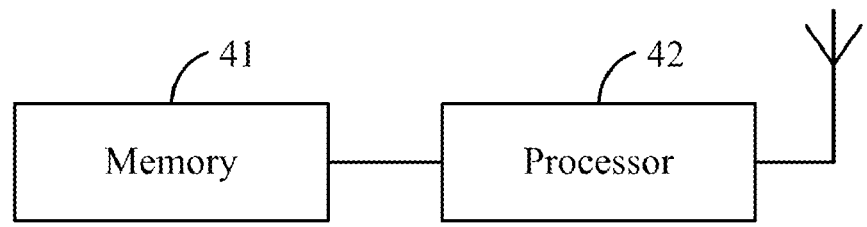
FIG. 11 is a schematic flow chart of another device for providing a Policy and Charging Control (PCC) rule according to an embodiment of the invention.

As illustrated in FIG. 11, another device for providing a Policy and Charging Control (PCC) rule according to an embodiment of the invention includes a memory 41 and a processor 42, where the processor 42 is configured with a computer program, etc., for performing the flow of the method for providing a PCC rule according to the embodiment above of the invention; the memory 41 is configured to store codes of the computer program to configure the processor 42; and the processor 42 can include a baseband processing component, a radio frequency processing component, and other components as needed in reality to transmit related information. Particularly:

The processor 42 is configured to receive an instruction message for setting up an IP Connectivity Access network (IP-CAN) session for a User Equipment (UE), sent by a Mobile Network Operator Policy and Charging Rule Function (MNO-PCRF); and The processor 42 is configured to determine a PCC rule of the UE from the instruction message, and to send to the MNO-PCRF an IP-CAN session setup acknowledgement message carrying the PCC rule of the UE.

Preferably the processor 42 is configured to receive an alert sent by the MNO-PCRF that a granted capacity of an MVNO serving the UE is exceeded; and The processor 42 is configured to allocate again a new PCC rule for the UE in response to the alert, and to send the new PCC rule to the MNO-PCRF.

Preferably the processor 42 is further configured to allocate again a new PCC rule for the UE, and to send the new PCC rule to the MNO-PCRF, when an IP-CAN session which is set up for the UE needs to be modified.

Preferably the processor 42 is further configured to receive an instruction message sent by the MNO-PCRF to terminate an IP-CAN session which is set up for the UE, when the IP-CAN session which is set up for the UE needs to be terminated, to determine the PCC rule corresponding to the UE from the instruction message, and to send to the MNO-PCRF an acknowledgement message to terminate the IP-CAN session which is set up for the UE.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer usable storage mediums (including but not limited to a disk memory, an optical memory, etc.) in which computer usable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for controlling a network capacity, the method comprising:

receiving, by a Mobile Network Operator Policy and Charging Rule Function (MNO-PCRF), an instruction message for setting up an IP Connectivity Access network (IP-CAN) session for a User Equipment (UE), obtaining a UE identifier from the instruction message, and determining from the UE identifier a Mobile Virtual Network Operator (MVNO) serving the UE corresponding to the UE identifier;

forwarding, by the MNO-PCRF, the IP-CAN session setup instruction message to a Policy and Charging Rule Function (PCRF) in the MVNO (MVNO-PCRF), the MVNO serving the UE;

receiving, by the MNO-PCRF, an IP-CAN session setup acknowledgement message carrying a Policy and Charging Control (PCC) rule of the UE, sent by the MVNO-PCRF, wherein the PCC rule of the UE comprises a first granted bandwidth allocated by the MVNO-PCRF for the UE;

upon determining according to the PCC rule of the UE that the MVNO serving the UE does not exceed a granted capacity of the MVNO, replying, by the MNO-PCRF, to a network element sending the instruction message, with the P-CAN session setup acknowledgment message for the UE; and upon determining according to the PCC rule of the UE that the MVNO serving the UE exceeds the granted capacity of the MVNO, sending, by the MNO-PCRF, to the MVNO-PCRF an alert that the granted capacity of the MVNO serving the UE is exceeded;

wherein after the alert is sent to the MVNO-PCRF that the granted capacity of the MVNO serving the UE is exceeded, the method further comprises:

starting a preset wait timer;

when a new PCC rule of the UE sent from the MVNO-PCRF is received by the MNO-PCRF before the wait timer expires, then determining again according to the new PCC rule of the UE whether the MVNO serving the UE exceeds the granted capacity of the MVNO, wherein the new PCC rule of the UE comprises a second granted bandwidth allocated by the MVNO-PCRF for the UE, the second granted bandwidth is allocated so as to avoid exceeding the granted capacity of the MVNO; and when no new PCC rule of the UE sent by the MVNO-PCRF is received before the wait timer expires, then replying to the network element sending the instruction message, with an IP-CAN session setup failure message for the UE.

2. The method according to claim 1, wherein replying to the network element sending the instruction message, with the IP-CAN session setup acknowledgment message for the UE upon determining according to the PCC rule of the UE that the MVNO serving the UE does not exceed the granted capacity of the MVNO comprises:

determining, by the MNO-PCRF, according to the PCC rule of the UE through a preset Mobile Network Operator Bandwidth Control Function (MNO-MBCF)

whether the MVNO serving the UE exceeds the granted capacity of the MVNO, and replying to a network element sending the instruction message, with the IP-CAN session setup acknowledgment message for the UE upon determining that the MVNO serving the UE does not exceed the granted capacity of the MVNO.

3. The method according to claim 2, wherein determining, by the MNO-PCRF, according to the PCC rule of the UE through the preset Mobile Network Operator Bandwidth Control Function (MNO-MBCF) whether the MVNO serving the UE exceeds the granted capacity of the MVNO comprises:
  extracting Quality of Service (QoS) information of the UE from the PCC rule of the UE, and sending the QoS information to the preset MNO-MBCF, so that the MNO-MBCF obtains a bandwidth granted for the UE by the MVNO serving the UE, included in the QoS information of the UE, determines a sum of a bandwidth used by the MVNO serving the UE and the bandwidth granted for the UE by the MVNO, and determines whether the sum is more than the granted capacity of the MVNO serving the UE, and if so, then the MNO-PCRF receiving an alert fed back by the MNO-MBCF that the granted capacity of the MVNO serving the UE is exceeded; otherwise, the MNO-PCRF receiving an alert fed back by the MNO-MBCF that a condition for setting up the IP-CAN session for the UE is satisfied.

4. The method according to claim 1, wherein the method further comprises:
  receiving an instruction message to terminate an IP-CAN session which is set up for the UE, when the IP-CAN session is set up for the UE and the IP-CAN session which is set up for the UE needs to be terminated;
  forwarding the instruction message to terminate the IP-CAN session which is set up for the UE, to the MVNO-PCRF; and
  updating the sum of granted bandwidths of all the UEs served by the MVNO serving the UE upon reception of an acknowledgment message for terminating the IP-CAN session which is setup for the UE, replied by the MVNO-PCRF.

5. The method according to claim 4, wherein updating the sum of granted bandwidths of all the UEs served by the MVNO serving the UE comprises:
  sending to a preset MNO-MBCF a message to terminate the IP-CAN session which is set up for the UE, so that the preset MNO-MBCF updates the sum of granted bandwidths of all the UEs served by the MVNO serving the UE.

6. A method for providing a Policy and Charging Control (PCC) rule, the method comprising:
  receiving, by a Policy and Charging Rule Function (PCRF) in the MVNO (MVNO-PCRF), an instruction message for setting up an IP Connectivity Access network (IP-CAN) session for a User Equipment (UE), sent by a Mobile Network Operator Policy and Charging Rule Function (MNO-PCRF);
  determining, by the MVNO-PCRF, a PCC rule of the UE from the instruction message, and sending to the MNO-PCRF an IP-CAN session setup acknowledgement message carrying the PCC rule of the UE, wherein the PCC rule of the UE comprises a first granted bandwidth allocated by the MVNO-PCRF for the UE;
  receiving, by the MVNO-PCRF, an alert sent from the MNO-PCRF that a granted capacity of an MVNO serving the UE is exceeded; and
  allocating, by the MVNO-PCRF, again a new PCC rule for the UE in response to the alert, and sending the new PCC rule to the MNO-PCRF, wherein the new PCC rule comprises a second granted bandwidth allocated by the MVNO-PCRF for the UE, the second granted bandwidth is allocated so as to avoid exceeding the granted capacity of the MVNO.

7. The method according to claim 6, wherein the method further comprises:
  receiving, by the MVNO-PCRF, an instruction message sent by the MNO-PCRF to terminate an IP-CAN session which is set up for the UE when the IP-CAN session which is set up for the UE needs to be terminated, and determining the PCC rule corresponding to the UE from the instruction message; and
  sending, by the MVNO-PCRF, to the MNO-PCRF an acknowledgement message to terminate the P-CAN session which is set up for the UE.

8. A device for controlling a network capacity, the device comprising:
  a transceiver;
  a processor; and
  a memory storing at least one instruction, wherein the processor is configured to execute the at least one instruction to:
  control the transceiver to receive an instruction message for setting up an IP Connectivity Access network (IP-CAN) session for a User Equipment (UE), obtain a UE identifier from the instruction message, and determine from the UE identifier a Mobile Virtual Network Operator (MVNO) serving the UE corresponding to the UE identifier;
  control the transceiver to forward the IP-CAN session setup instruction message to a Policy and Charging Rule Function (PCRF) in the MVNO (MVNO-PCRF), the MVNO serving the UE;
  control the transceiver to receive an IP-CAN session setup acknowledgement message carrying a Policy and Charging Control (PCC) rule of the UE, sent by the MVNO-PCRF, wherein the PCC rule of the UE comprises a first granted bandwidth allocated by the MVNO-PCRF for the UE;
  control the transceiver to reply to a network element sending the instruction message, with the IP-CAN session setup acknowledgment message for the UE upon determining according to the PCC rule of the UE that the MVNO serving the UE does not exceed a granted capacity of the MVNO, and control the transceiver to send to the MVNO-PCRF an alert that the granted capacity of the MVNO serving the UE is exceeded, upon determining according to the PCC rule of the UE that the MVNO serving the UE exceeds the granted capacity of the MVNO; and
  start a preset wait timer after the transceiver sends to the MVNO-PCRF the alert that the granted capacity of the MVNO serving the UE is exceeded, and when a new PCC rule of the UE forwarded by the transceiver is received before the wait timer expires, determine again according to the new PCC rule of the UE whether the MVNO serving the UE exceeds the granted capacity of the MVNO, wherein the new PCC rule of the UE comprises a second granted bandwidth allocated by the MVNO-PCRF for the UE, the second granted bandwidth is allocated so as to avoid exceeding the granted capacity of the MVNO; and when no new PCC rule of the UE sent by the MVNO-PCRF is received before the wait timer expires, control the transceiver to reply to the network element sending the instruction message, with an IP-CAN session setup failure message for the UE.

9. The device according to claim 8, wherein the processor is further configured to execute the at least one instruction to determine according to the PCC rule of the UE through a preset Mobile Network Operator Bandwidth Control Function (MNO-MBCF) whether the MVNO serving the UE exceeds the granted capacity of the MVNO.

10. The device according to claim 9, wherein the processor is specifically configured to execute the at least one instruction to:
   extract Quality of Service (QoS) information of the UE from the PCC rule of the UE, and control the transceiver to send the QoS information to the preset MNO-MBCF, so that the MNO-MBCF obtains a bandwidth granted for the UE by the MVNO serving the UE, included in the QoS information of the UE, determines a sum of a bandwidth used by the MVNO serving the UE and the bandwidth granted for the UE by the MVNO, and determines whether the sum is more than the granted capacity of the MVNO serving the ULE, and if so, control the transceiver to receive an alert fed back by the MNO-MBCF that the granted capacity of the MVNO serving the UE is exceeded; otherwise, control the transceiver to receive an alert fed back by the MNO-MBCF that a condition for setting up an IP-CAN session for the UE is satisfied.

11. The device according to claim 8, wherein the processor is further configured to execute the at least one instruction to control the transceiver to receive an instruction message to terminate an IP-CAN session which is set up for the UE, when the IP-CAN session is set up for the UE and the IP-CAN session which is set up for the UE needs to be terminated;
   control the transceiver to forward the instruction message to terminate the IP-CAN session which is set up for the UE, to the MVNO-PCRF; and
   update the sum of granted bandwidths of all the UEs served by the MVNO serving the UE when the transceiver receives an acknowledgment message for terminating the IP-CAN session which is setup for the UE, replied by the MVNO-PCRF.

12. The device according to claim 11, wherein the processor is further configured to execute the at least one instruction to control the transceiver to send to a preset MNO-MBCF a message to terminate the IP-CAN session which is set up for the UE, so that the preset MNO-MBCF updates the sum of granted bandwidths of all the UEs served by the MVNO serving the UE.

13. A device for providing a Policy and Charging Control (PCC) rule, the device comprising:
   a transceiver;
   a processor; and
   a memory storing at least one instruction, wherein the processor is configured to execute the at least one instruction to:
   control the transceiver to receive an instruction message for setting up an IP Connectivity Access network (IP-CAN) session for a User Equipment (UE), sent by from a Mobile Network Operator Policy and Charging Rule Function (MNO-PCRF);
   determine a PCC rule of the UE from the instruction message, and control the transceiver to send to the MNO-PCRF an IP-CAN session setup acknowledgement message carrying the PCC rule of the UE, wherein the PCC rule of the UE comprises a first granted bandwidth allocated by the MVNO-PCRF for the UE;
   control the transceiver to receive an alert sent from the MNO-PCRF that a granted capacity of an MVNO serving the UE is exceeded; and
   allocate again a new PCC rule for the UE in response to the alert, and control the transceiver to send the new PCC rule to the MNO-PCRF, wherein the new PCC rule comprises a second granted bandwidth allocated by the MVNO-PCRF for the UE, the second granted bandwidth is allocated so as to avoid exceeding the granted capacity of the MVNO.

14. The device according to claim 13, wherein the processor is further configured to execute the at least one instruction to: control the transceiver to receive an instruction message sent by the MNO-PCRF to terminate an IP-CAN session which is set up for the UE when the IP-CAN session which is set up for the UE needs to be terminated, determine the PCC rule corresponding to the UE from the instruction message, and control the transceiver to send to the MNO-PCRF an acknowledgement message to terminate the IP-CAN session which is set up for the UE.

* * * * *